US 8,090,814 B2

(12) United States Patent
Arroyo et al.

(10) Patent No.: US 8,090,814 B2
(45) Date of Patent: Jan. 3, 2012

(54) METHOD FOR DETERMINING DISTRIBUTION OF A SHARED RESOURCE AMONG A PLURALITY OF NODES IN A NETWORK

(75) Inventors: Sharon Filipowski Arroyo, Sammamish, WA (US); Raju Shankar Mattikalli, Sammamish, WA (US); Changzhou Wang, Bellevue, WA (US); Guijun Wang, Issaquah, WA (US); Rodolfo A Santiago, Bellevue, WA (US)

(73) Assignee: The Boeing Company, Chicago, IL (US)

(*) Notice: Subject to any disclaimer, the term of this patent is extended or adjusted under 35 U.S.C. 154(b) by 34 days.

(21) Appl. No.: 12/633,164

(22) Filed: Dec. 8, 2009

(65) Prior Publication Data

US 2011/0134934 A1    Jun. 9, 2011

(51) Int. Cl.
*G06F 15/173* (2006.01)
(52) U.S. Cl. ........................................ 709/223
(58) Field of Classification Search ........................ None
See application file for complete search history.

(56) References Cited

U.S. PATENT DOCUMENTS

| | | | |
|---|---|---|---|
| 5,479,404 A | 12/1995 | Francois et al. | |
| 5,701,465 A | 12/1997 | Baugher et al. | |
| 6,404,738 B1 | 6/2002 | Reininger et al. | |
| 6,643,682 B1* | 11/2003 | Todd et al. | 709/202 |
| 6,675,229 B1* | 1/2004 | Bruno et al. | 719/328 |
| 7,356,187 B2* | 4/2008 | Shanahan et al. | 382/224 |
| 2005/0204054 A1 | 9/2005 | Wang et al. | |
| 2007/0064711 A1* | 3/2007 | Wang et al. | 370/395.4 |
| 2009/0116380 A1 | 5/2009 | Santiago et al. | |
| 2010/0333111 A1* | 12/2010 | Kothamasu et al. | 709/203 |

FOREIGN PATENT DOCUMENTS

WO    2004102896 A2    11/2004

OTHER PUBLICATIONS

Samarth H. Shah et al.; Dynamic Bandwidth Management for Single-hop Ad Hoc Wireless Networks; Proceedings for the First IEEE Intnl Conference on Pervasive Computing and Communications; Jan. 2003.
Guijun Wang, et al.; Service Level Management using QoS Monitoring, Diagnostics, and Adaptation for Networked Enterprise Systems; Proceedings of the 2005 Ninth IEEE IntnI EDOC Enterprise Computing Conference; Sep. 2005.

(Continued)

*Primary Examiner* — Anh-Vu Ly
(74) *Attorney, Agent, or Firm* — Law Office of Donald D. Mondul (57) ABSTRACT

A method determining distribution of a shared resource among nodes in a network includes: (a) identifying each node according to a function performed by the node; brokers collecting messages from the nodes and disseminating messages among the nodes; publishers originating messages for transmission via the network; subscribers receiving messages transmitted via the network; (b) in no particular order: (1) identifying a need for each node; and (2) identifying the shared resource available for distribution; (c) communicating the shared resource available for distribution within the network to the brokers; and (d) operating each broker to: (1) coordinate communication with all other brokers and individually apply an algorithm to optimally allocate the shared resource among the brokers; or (2) communicate with a central facility coupled with each broker while the central facility applies an algorithm to optimally allocate the shared resource among the brokers.

20 Claims, 4 Drawing Sheets

OTHER PUBLICATIONS

Changzhou Wang, et al.; Quality of Service Contract Specification, Establishment, and Monitoring for Service Level Management; Journal of Object Technology, vol. 6, No. 11; Special Issue Dec. 2007, pp. 25-44.

Changzhou Wang, et al.; Quality of Service Contract Specification, Establishment, and Monitoring for Service Level Management;10th IEEE Intnl Enterprise Distributed Object Computing Conference Workshops; Apr. 2006.

Guijin Wang, et al.; Integrated Quality of Service (QoS) Management in Service-Oriented Enterprise Architectures; Proceedings of the 8th IEEE Intnl Enterprise Distributed Object Computing Conf; Sep. 2004.

Changzhou Wang, et al.; A Policy-Based Approach for QoS Specification and Enforcement in Distributed Service-Oriented Architecture; Proceedings of the 2005 IEEE Intnl Conference on Services Computing; Jul. 2005.

Gjermundrod, H. et al.; "Gridstat: A Flexible QoS-Managed Data Dissemination Framework for the Power Grid"; IEEE Transactions on Power Delivery, IEEE Service Center, New York NY; vol. 24, No. 1; Jan. 1, 2009; pp. 136-143.

Johnston, R.A., et al.; "Distributing Time-Synchronous Phasor Measurement Data Using the GridStat Communication Infrastructure"; System Sciences, 2006; HICSS '06; Proceedings of the 39th Annual Hawaii International Conference on Kauai, HI; Jan. 4-7, 2006; Piscataway, NJ; IEEE, vol. 10; Jan. 4, 2006; pp. 245B-245B.

Extended European Search Report of Mar. 4, 2011, re: European Application No. 10193371.1.

* cited by examiner

METHOD FOR DETERMINING DISTRIBUTION OF A SHARED RESOURCE AMONG A PLURALITY OF NODES IN A NETWORK

TECHNICAL FIELD

The present disclosure is directed to communication networks, and especially to communication networks including a plurality of nodes among which a shared resource may be distributed.

BACKGROUND

Quality of Service (QoS) may refer to a perceived or measured quality that network service providers may offer to clients. Quality may be specified using commonly known characteristics of message criticality and urgency. Quality may be specified using technical parameters such as response time, deadline, guarantee, ordering, frame rate, jitter, priority, or similar measures. QoS Management may refer to an ability of a system to provide services to client applications at agreed QoS characteristics. For message oriented systems, QoS management may refer to assignment of different performance levels for transport and processing of messages by client and server applications, middleware and networks. QoS management may involve setup and control of QoS characteristics.

Concurrent applications in mission critical systems may have competing demands for system resources. Generally speaking, mission objectives may include collecting, processing, and delivering information (such as, by way of example and not by way of limitation, messages) to the right people at the right time. Specifically, mission objectives may be to allocate system resources to concurrent applications so that the applications can accomplish required or desired information collection, processing, and delivery with minimal delays. To achieve mission objectives, QoS management may provide controls for intelligently allocating resources to meet demands based on criticality and urgency and dynamically adapting the resource allocations to respond to changing situations. Network communication bandwidth (bandwidth may be a measure of capacity) may be a scarce resource that distributed systems may need to share in order to accomplish overall mission objectives.

In a messaging-based system architecture, message clients such as publishers (a publisher may include, by way of example and not by way of limitation, a sensor application) and subscribers (a subscriber may include, by way of example and not by way of limitation, a command and control application) may send and receive messages through information brokers (InfoBrokers, or brokers). A broker may be responsible for collecting and disseminating messages between or among publishers and subscribers. The clients (publishers and subscribers) and brokers may be situated in a distributed networked environment and may share communication bandwidth in sending, receiving and disseminating messages. In a non-message-based system, each networked computing node may be an equivalent broker where clients on the node may generate (i.e., publish) or consume (i.e., subscribe) messages in the network. QoS management may provide controls on how each generator, consumer, and broker of a networked system may advantageously utilize network resources to achieve the mission objectives of the networked system.

There is a need for a method for determining distribution of a shared resource among a plurality of nodes in a network that can automatically allocate the shared resource among distributed clients and brokers so that resource utilization is optimized to mission objectives.

There is a need for a method for determining distribution of a shared resource among a plurality of nodes in a network that can automatically and adaptively re-allocate bandwidth in real-time in dynamically changing message QoS characteristics and mission situations.

SUMMARY

A method determining distribution of a shared resource among nodes in a network includes: (a) identifying each node according to a function performed by the node; brokers collecting messages from the nodes and disseminating messages among the nodes; publishers originating messages for transmission via the network; subscribers receiving messages transmitted via the network; (b) in no particular order: (1) identifying a need for each node; and (2) identifying the shared resource available for distribution; (c) communicating the shared resource available for distribution within the network to the brokers; and (d) operating each broker to: (1) coordinate communication with all other brokers and individually apply an algorithm to optimally allocate the shared resource among the brokers; or (2) communicate with a central facility coupled with each broker while the central facility applies an algorithm to optimally allocate the shared resource among the brokers. Identification of need for each node may be carried out with consideration of at least one of message size, rate or QoS characteristics.

It is, therefore, a feature of the present disclosure to provide a method for determining distribution of a shared resource among a plurality of nodes in a network that can automatically allocate the shared resource among distributed clients and brokers so that resource utilization is optimized to mission objectives defined mathematically as benefit values.

It is another feature of the present disclosure to provide a method for determining distribution of a shared resource among a plurality of nodes in a network that can automatically and adaptively re-allocate bandwidth in real-time in dynamically changing message QoS characteristics and mission situations.

Further features of the present disclosure will be apparent from the following specification and claims when considered in connection with the accompanying drawings, in which like elements are labeled using like reference numerals in the various figures, illustrating the preferred embodiments of the disclosure.

DETAILED DESCRIPTION

A networked system or system of systems may be disclosed as a cooperating networked system of nodes sharing common network communication resources. By cooperation, each node in the network may provide its benefit value of delivering pending messages. The calculated benefit value may take into account importance and urgency QoS properties of the messages. By such a cooperative design, the networked system may get a mission level operation picture knowing all the individual demands of the network nodes, and therefore can make a mission level optimal bandwidth or other resource allocation to nodes. By cooperation each node may enforce its assigned resource allocation.

A coordination process for the information system nodes in the network may be disclosed for calculating and exchanging their benefit values. Each node may calculate its individual benefit value instantaneously from pending or projected messages and the QoS importance and urgency properties of the pending or projected messages. Benefit values may be disseminated in one of two fashions depending on the networked system setup: (1) Disseminated to a Central Authority (CA). A Central Authority may be embodied in facility logical entity or function that may be executed in one of the nodes, in a separate physical entity such as a central facility not included in another node, or in a combination of a logical function and a physical entity. Once the CA collects the benefit values, the CA may use one or more optimization algorithms to calculate an optimal resource allocation to each node. The CA may then send the allocations to each of the nodes. Each node may enforce its own allocation. This approach may minimize the communication and computation cost. (2) Disseminated to each other in a peer-to-peer fashion. Once a respective node knows the benefit values of other nodes in the network, the respective node may use one or more optimization algorithms to calculate an optimal resource allocation for itself and may then enforce this allocation on itself. This process may be repeated every window of time to ensure the allocation is optimal to the overall mission at that time. This approach may introduce extra communication and computation overhead but may improve robustness when communication links among brokers are not reliable.

Resource allocation may be dynamically determined in an optimal way to meet the mission objectives for given problem assumptions. The determination may be based on one of the two coordination processes described above considering the importance and urgency of messages in a mission.

Figure 1:
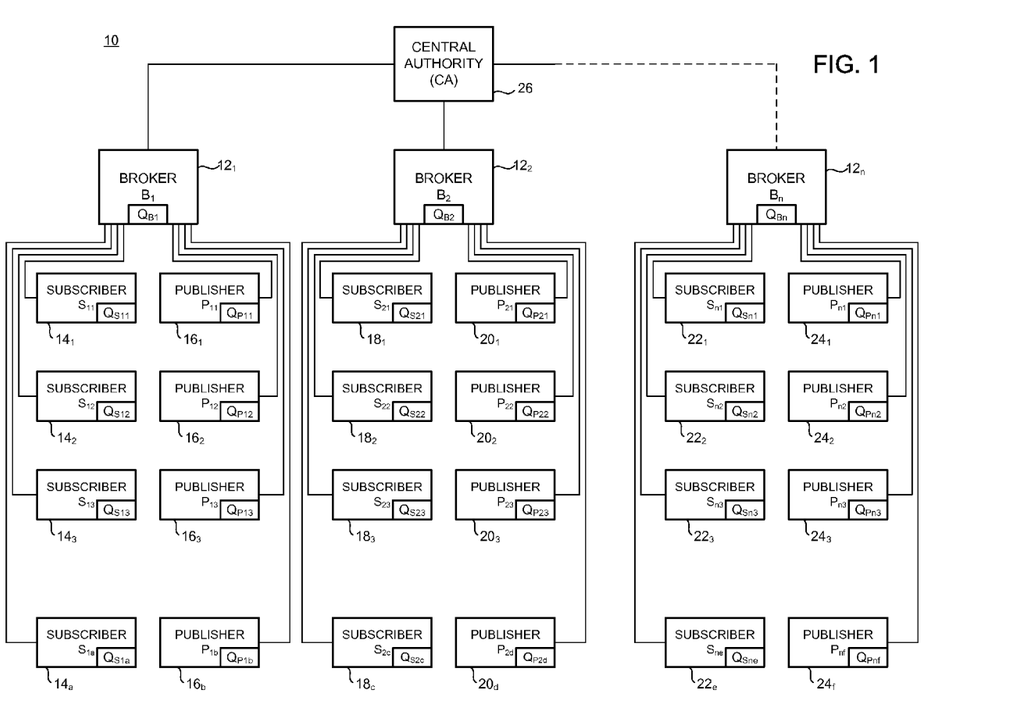
FIG. 1 is a schematic diagram of a first embodiment of a network employing the present disclosure.

FIG. 1 is a schematic diagram of a first embodiment of a network employing the present disclosure. In FIG. 1, a network 10 may include brokers $12_1$, $12_2$, $12_n$. The indicator "n" is employed to signify that there can be any number of brokers in network 10. The inclusion of three brokers $12_1$, $12_2$, $12_n$ in FIG. 1 is illustrative only and does not constitute any limitation regarding the number of brokers that may be included in the network of the present disclosure. Throughout this description, use of a reference numeral using a generic subscript herein may be taken to mean that any respective member of the plurality of elements having the same reference numeral may be regarded as included in the description. Thus, by way of example and not by way of limitation, referring to broker $12_n$ in describing FIG. 1 may be taken to mean that any broker—$12_1$, $12_2$, or $12_n$ (FIG. 1)—may be regarded as capable of employment as described.

Broker $12_1$ may have associated Quality of Service (QoS) parameters assigned or otherwise related with broker $12_1$, as indicated by a block $Q_{B1}$.

Each broker $12_n$ may be coupled with one or more subscriber and may be coupled with one or more publisher. Thus, broker $12_1$ may be coupled with subscribers $14_1$, $14_2$, $14_3$, $14_a$. The indicator "a" is employed to signify that there can be any number of subscribers coupled with broker $12_1$ in network 10. The inclusion of four subscribers $14_1$, $14_2$, $14_3$, $14_a$ in FIG. 1 is illustrative only and does not constitute any limitation regarding the number of subscribers that may be coupled with broker $12_1$ in the network of the present disclosure. Subscribers $14_a$ may have associated Quality of Service (QoS) parameters assigned or otherwise related with subscribers $14_a$, as indicated by blocks $Q_{S11}$, $Q_{S12}$, $Q_{S13}$, $Q_{S1a}$.

Broker $12_1$ may be coupled with publishers $16_1$, $16_2$, $16_3$, $16_b$. The indicator "b" is employed to signify that there can be any number of publishers coupled with broker $12_1$ in network 10. The inclusion of four publishers $16_1$, $16_2$, $16_3$, $16_b$ in FIG. 1 is illustrative only and does not constitute any limitation regarding the number of publishers that may be coupled with broker $12_1$ in the network of the present disclosure. Publishers $16_b$ may have associated Quality of Service (QoS) parameters assigned or otherwise related with publishers $14_b$, as indicated by blocks $Q_{P11}$, $Q_{P12}$, $Q_{P13}$, $Q_{P1b}$.

Broker $12_2$ may have associated Quality of Service (QoS) parameters assigned or otherwise related with broker $12_2$, as indicated by a block $Q_{B2}$.

Broker $12_2$ may be coupled with subscribers $18_1$, $18_2$, $18_3$, $18_c$. The indicator "c" is employed to signify that there can be any number of subscribers coupled with broker $12_2$ in network 10. The inclusion of four subscribers $18_1$, $18_2$, $18_3$, $18_c$ in FIG. 1 is illustrative only and does not constitute any limitation regarding the number of subscribers that may be coupled with broker $12_2$ in the network of the present disclosure. Subscribers $18_c$ may have associated Quality of Service (QoS) parameters assigned or otherwise related with subscribers $18_c$, as indicated by blocks $Q_{S11}$, $Q_{S22}$, $Q_{S23}$, $Q_{S2c}$.

Broker $12_2$ may be coupled with publishers $20_1$, $20_2$, $20_3$, $20_d$. The indicator "d" is employed to signify that there can be any number of publishers coupled with broker $12_2$ in network 10. The inclusion of four publishers $20_1$, $20_2$, $20_3$, $20_d$ in FIG. 1 is illustrative only and does not constitute any limitation regarding the number of publishers that may be coupled with broker $12_2$ in the network of the present disclosure. Publishers $20_d$ may have associated Quality of Service (QoS) parameters assigned or otherwise related with publishers $14_b$, as indicated by blocks $Q_{P21}$, $Q_{P22}$, $Q_{P23}$, $Q_{P2d}$.

Broker $12_n$ may have associated Quality of Service (QoS) parameters assigned or otherwise related with broker $12_n$, as indicated by a block $Q_{Bn}$.

Broker $12_n$ may be coupled with subscribers $22_1$, $22_2$, $22_3$, $22_e$. The indicator "e" is employed to signify that there can be any number of subscribers coupled with broker $12_n$ in network 10. The inclusion of four subscribers $22_1$, $22_2$, $22_3$, $22_e$ in FIG. 1 is illustrative only and does not constitute any limitation regarding the number of subscribers that may be coupled with broker $12_n$ in the network of the present disclosure. Subscribers $22_e$ may have associated Quality of Service (QoS) parameters assigned or otherwise related with subscribers $22_e$, as indicated by blocks $Q_{Sn1}$, $Q_{Sn2}$, $Q_{Sn3}$, $Q_{Sne}$.

Broker $12_n$ may be coupled with publishers $24_1$, $24_2$, $24_3$, $24_f$. The indicator "f" is employed to signify that there can be any number of publishers coupled with broker $12_n$ in network 10. The inclusion of four publishers $24_1$, $24_2$, $24_3$, $24_f$ in FIG. 1 is illustrative only and does not constitute any limitation regarding the number of publishers that may be coupled with broker $12_n$ in the network of the present disclosure. Publishers $24_f$ may have associated Quality of Service (QoS) parameters assigned or otherwise related with publishers $24_f$, as indicated by blocks $Q_{Pn1}$, $Q_{Pn2}$, $Q_{Pn3}$, $Q_{Pnf}$.

Brokers $12_n$ may be coupled with a central authority (CA) 26 so that any broker $12_n$ must communicate with CA 26 in order to convey information to another broker $12_n$. In practicing the present disclosure, each broker $12_n$ may collect QoS or another indication of requirements for meeting performance criteria based upon present or next-in-time communication levels or similar measures from each coupled subscriber and each coupled publisher. Thus, broker $12_1$ may collect indication of requirements from subscribers $14_a$ and publishers $16_b$. Broker $12_2$ may collect indication of requirements from subscribers $18_c$ and publishers $20_d$. Broker $12_n$ may collect indication of requirements from subscribers $22_e$ and publishers $24_f$. Brokers $12_1$, $12_2$, $12_n$ may each calculate their respective requirements and may pass those requirements to CA 26. CA 26 may calculate apportionment of resources among brokers $12_n$. Alternatively brokers $12_n$ may each calculate their respective requirements, CA 26 may also calculate the requirements of brokers $12_n$, and brokers $12_n$ may cooperate with CA 26 to optimize distribution of resources among brokers $12_n$.

Figure 2:
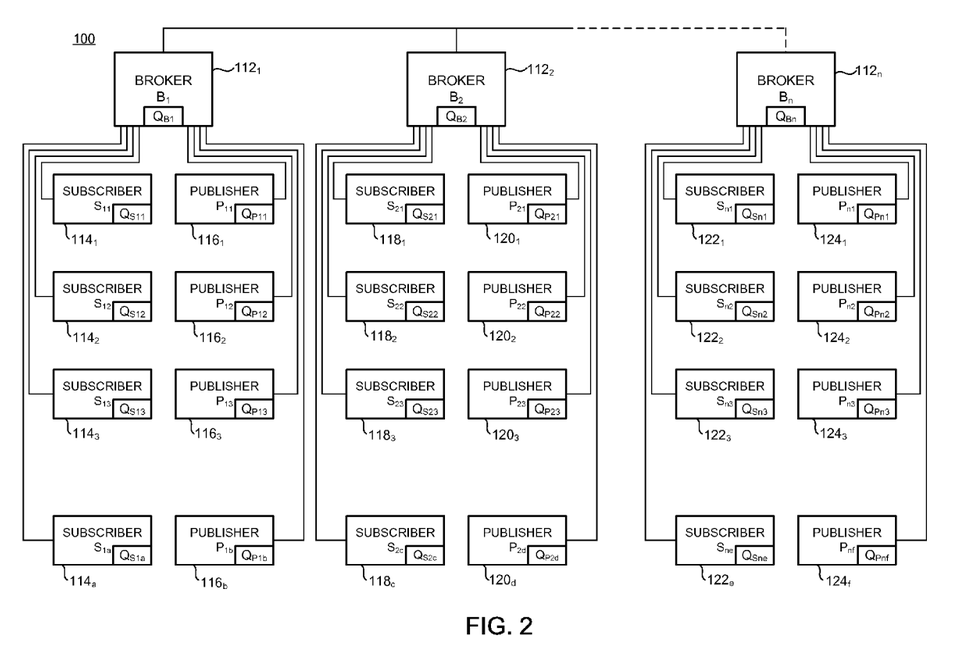
FIG. 2 is a schematic diagram of a second embodiment of a network employing the present disclosure.

FIG. 1 may illustrate a Central Authority arrangement for the present disclosure. In such a Central Authority arrangement, requirements, or benefit values, for brokers $12_n$, subscribers $14_a$, $18_c$, $22_e$, and publishers $16_b$, $20_d$, $24_f$ (nodes) may be disseminated to Central Authority (CA) 26. Once CA 26 collects the benefit values, CA 26 may use one or more optimization algorithms to calculate an optimal resource allocation to each node. CA 26 may then send the allocations to each of the nodes. Each node may enforce its own allocation. This Central Authority arrangement may minimize the communication and computation cost. FIG. 2 is a schematic diagram of a second embodiment of a network employing the present disclosure. In FIG. 2, a network 100 may include brokers $112_1$, $112_2$, $112_n$. The indicator "n" is employed to signify that there can be any number of brokers in network 100. The inclusion of three brokers $112_1$, $112_2$, $112_n$ in FIG. 2 is illustrative only and does not constitute any limitation regarding the number of brokers that may be included in the network of the present disclosure. Throughout this description, use of a reference numeral using a generic subscript herein may be taken to mean that any respective member of the plurality of elements having the same reference numeral may be regarded as included in the description. Thus, by way of example and not by way of limitation, referring to broker $112_n$ in describing FIG. 2 may be taken to mean that any broker—$112_1$, $112_2$, or $112_n$ (FIG. 2)—may be regarded as capable of employment as described.

Broker $112_1$ may have associated Quality of Service (QoS) parameters assigned or otherwise related with broker $112_1$, as indicated by a block $Q_{B1}$.

Each broker $112_n$ may be coupled with one or more subscriber and may be coupled with one or more publisher. Thus, broker $112_1$ may be coupled with subscribers $114_1$, $114_2$, $114_3$, $114_a$. The indicator "a" is employed to signify that there can be any number of subscribers coupled with broker $112_1$ in network 110. The inclusion of four subscribers $114_1$, $114_2$, $114_3$, $114_a$ in FIG. 2 is illustrative only and does not constitute any limitation regarding the number of subscribers that may be coupled with broker $112_1$ in the network of the present disclosure. Subscribers $114_a$ may have associated Quality of Service (QoS) parameters assigned or otherwise related with subscribers $114_a$, as indicated by blocks $Q_{S11}$, $Q_{S12}$, $Q_{S13}$, $Q_{S1a}$.

Broker $112_1$ may be coupled with publishers $116_1$, $116_2$, $116_3$, $116_b$. The indicator "b" is employed to signify that there can be any number of publishers coupled with broker $112_1$ in network 100. The inclusion of four publishers $116_1$, $116_2$, $116_3$, $116_b$ in FIG. 2 is illustrative only and does not constitute any limitation regarding the number of publishers that may be coupled with broker $112_1$ in the network of the present disclosure. Publishers $116_b$ may have associated Quality of Service (QoS) parameters assigned or otherwise related with publishers $114_b$, as indicated by blocks $Q_{P11}$, $Q_{P12}$, $Q_{P13}$, $Q_{P1b}$.

Broker $112_2$ may have associated Quality of Service (QoS) parameters assigned or otherwise related with broker $112_2$, as indicated by a block $Q_{B2}$.

Broker $112_2$ may be coupled with subscribers $118_1$, $118_2$, $118_3$, $118_c$. The indicator "c" is employed to signify that there can be any number of subscribers coupled with broker $112_2$ in network 100. The inclusion of four subscribers $118_1$, $118_2$, $118_3$, $118_c$ in FIG. 2 is illustrative only and does not constitute any limitation regarding the number of subscribers that may be coupled with broker $112_2$ in the network of the present disclosure. Subscribers $118_c$ may have associated Quality of Service (QoS) parameters assigned or otherwise related with subscribers $118_c$, as indicated by blocks $Q_{S11}$, $Q_{S22}$, $Q_{S23}$, $Q_{S2c}$.

Broker $112_2$ may be coupled with publishers $120_1$, $120_2$, $120_3$, $120_d$. The indicator "d" is employed to signify that there can be any number of publishers coupled with broker $112_2$ in network 100. The inclusion of four publishers $120_1$, $120_2$, $120_3$, $120_d$ in FIG. 2 is illustrative only and does not constitute any limitation regarding the number of publishers that may be coupled with broker $112_2$ in the network of the present disclosure. Publishers $120_d$ may have associated Quality of Service (QoS) parameters assigned or otherwise related with publishers $114_b$, as indicated by blocks $Q_{P21}$, $Q_{P22}$, $Q_{P23}$, $Q_{P2d}$.

Broker $112_n$ may have associated Quality of Service (QoS) parameters assigned or otherwise related with broker $112_n$, as indicated by a block $Q_{Bn}$.

Broker $112_n$ may be coupled with subscribers $122_1$, $122_2$, $122_3$, $122_e$. The indicator "e" is employed to signify that there can be any number of subscribers coupled with broker $112_n$ in network 100. The inclusion of four subscribers $122_1$, $122_2$, $122_3$, $122_e$ in FIG. 2 is illustrative only and does not constitute any limitation regarding the number of subscribers that may be coupled with broker $112_n$ in the network of the present disclosure. Subscribers $122_e$ may have associated Quality of Service (QoS) parameters assigned or otherwise related with subscribers $122_e$, as indicated by blocks $Q_{Sn1}$, $Q_{Sn2}$, $Q_{Sn3}$, $Q_{Sne}$.

Broker $112_n$ may be coupled with publishers $124_1$, $124_2$, $124_3$, $124_f$. The indicator "f" is employed to signify that there can be any number of publishers coupled with broker $112_n$ in network 100. The inclusion of four publishers $124_1$, $124_2$, $124_3$, $124_f$ in FIG. 2 is illustrative only and does not constitute any limitation regarding the number of publishers that may be coupled with broker $112_n$ in the network of the present disclosure. Publishers $124_f$ may have associated Quality of Service (QoS) parameters assigned or otherwise related with publishers $124_f$, as indicated by blocks $Q_{Pn1}$, $Q_{Pn2}$, $Q_{Pn3}$, $Q_{Pnf}$.

Brokers $112_n$ may be coupled directly with each other so that any broker $112_n$ may communicate with another broker $112_n$. In practicing the present disclosure, each broker $112_n$ may collect QoS or another indication of requirements for meeting performance criteria based upon present or next-in-time communication levels or similar measures from each coupled subscriber and each coupled publisher. Thus, broker $112_1$ may collect indication of requirements from subscribers $114_a$ and publishers $116_b$. Broker $112_2$ may collect indication of requirements from subscribers $118_c$ and publishers $120_d$. Broker $112_n$ may collect indication of requirements from subscribers $122_e$ and publishers $124_f$. Brokers $112_1$, $112_2$, $112_n$ may each calculate their respective requirements and may share those calculation results with other brokers $112_n$.

Brokers $112_n$ may each calculate their respective requirements and brokers $112_n$ may cooperate to optimize distribution of resources among brokers $112_n$.

FIG. 2 may illustrate a Peer-to-Peer arrangement for the present disclosure. In such a Peer-to-Peer arrangement, requirements, or benefit values, for brokers $12_n$, subscribers $14_a$, $18_c$, $22_e$, and publishers $16_b$, $20_d$, $24_f$ (nodes) may be disseminated among nodes in a peer-to-peer fashion. Once a respective node knows the benefit values of other nodes in the network, the respective node may use one or more optimization algorithms to calculate an optimal resource allocation for itself and may then enforce this allocation on itself. This process may be repeated every window of time to ensure the allocation is optimal to the overall mission at that time. This approach may introduce extra communication and computation overhead but may improve robustness when communication links among brokers are not reliable.

Figure 3:
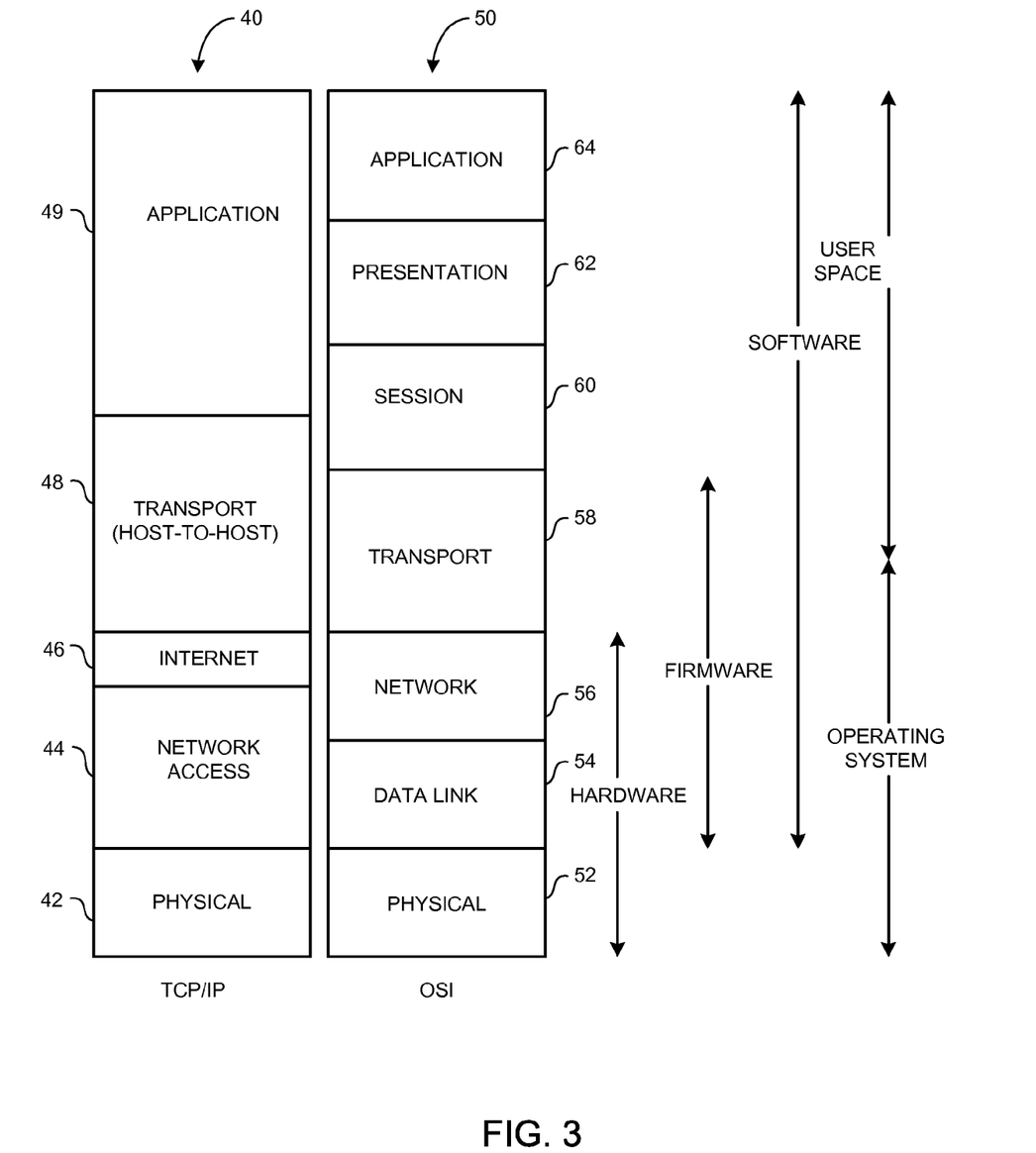
FIG. 3 is a schematic diagram of an environment in which the present disclosure may be employed.

FIG. 3 is a schematic diagram of an environment in which the present disclosure may be employed. In FIG. 3, electronic communications may be carried out pursuant to a predetermined architecture. Two such architectures, by way of example and not by way of limitation, employed today include a Transmission Control Protocol/Internet Protocol (TCP/IP) 40 and an Open Systems Interconnection (OSI) Protocol 50.

The layers of the protocols may indicate different functions provided by the protocols, as may be understood by one skilled in the art of electronic communication. In a TCP/IP protocol system 40, the physical layer 42 may address the physical interface between a data transmission device and a transmission medium or network. A network access layer 44 may be concerned with the exchange of data between an end system and a network to which the end system is attached. An internet layer 46 may use an internet protocol (IP) to provide a routing function across multiple networks. A transport layer 48 (sometimes referred to as a host-to-host layer) may provide mechanisms for ensuring reliability in exchanging data that is essentially independent of the application employed. An application layer 49 may contain logic needed to support various user applications.

In an OSI protocol system 50, a physical layer 52 may be concerned with transmission of unstructured bit stream over a physical medium and may deal with mechanical, electrical, functional and procedural characteristics to access the physical medium. A data link 54 may provide for reliable transfer of information across the physical link and may send blocks of data (sometimes called frames) with necessary synchronization, error control and flow control. A network layer 56 may provide upper layers with independence from the data transmission and switching technologies used to connect systems. Network layer 56 may be used to connect systems and may be responsible for establishing maintaining and terminating connections. A transport layer 58 may provide reliable transparent transfer of data between end points and may provide end-to-end error recovery and flow control. A session layer 60 may provide a control structure for communication between applications and may establish, manage and terminate connections (sometimes called sessions) between cooperating applications. A presentation layer 62 may provide independence to application processes from differences in data representation (sometimes called syntax). An application layer 64 may provide access to an OSI environment for users and may also provide distributed information services.

Implementation of the various layers in TCP/IP protocol 40 and OSI protocol 50 is indicated in FIG. 3. Hardware may implement lower TCP/IP layers 42, 44, 46 and lower OSI layers 52, 54, 56. Firmware may implement TCP/IP layers 44, 46, 48 and OSI layers 54, 56, 58. Software may contribute to implementing TCP/IP layers 44, 46, 48, 49 and OSI layers 54, 56, 58, 60, 62, 64. An operating system may be involved in implementing TCP/IP layers 42, 44, 46, 48 and OSI layers 52, 54, 56, 58. User space may be employed in implementing TCP/IP layers 48, 49 and OSI layers 58, 60, 62, 64.

Current systems may employ bandwidth management at the network transport layer and below. Policing and congestion avoidance may be two techniques that are employed. In policing, an intermediary node, such as a router, may limit the amount of traffic the intermediary node may forward downstream to what may have been specified in the service level agreement for a given traffic class. Incoming messages may be classified into one of these predetermined traffic classes. A message that arrives at the intermediary node at a time when the allocated bandwidth for its traffic class has been exceeded may be either dropped or downgraded, for example, to "Best Effort". "Best Effort" may be used in networking operations to "do what can be done without any guarantees".

Congestion avoidance may be another technique that may be used in bandwidth management. In congestion avoidance, an intermediary node may make itself apparent to the traffic sources when traffic levels are high. Congestion avoidance may be triggered when the amount of messages that are queued up for transmission in intermediary nodes reach a certain point. Traffic sources may then be notified of impending congestion directly (as in Explicit Congestion Notification or ECN) or indirectly (as in Random Early Drop, or RED). In ECN, a control message may be sent to traffic sources for the traffic sources to voluntarily decrease their outputs. Random Early Drop may discard message packets randomly when queue levels are high. The drop rate may increase as a function of the queue level. The assumption may be that the early and random drops will result in reception errors at a destination and will cause the destination to not send an acknowledgement of successful receipt. This non-acknowledgement may be interpreted by a sender as a sign of congestion, causing the sender to throttle message transmissions. This behavior may be encountered with TCP/IP traffic where there is flow control, but may not always be found with other types of traffic.

In contrast, the present disclosure performs traffic flow management and control before messages even enter a network. QoS management strategies and tactics may be employed on both the resource consumer and data producer side (i.e., among subscribers and publishers) and resource provider side (i.e., network control). Resources may include, by way of example and not by way of limitation, network bandwidth, memory, CPU time, and energy. The present disclosure may efficiently and effectively respond to mission requirements in which tasks and their importance, urgency and requirement for resources may change over time.

The present disclosure may implement resource (e.g., bandwidth) management through flow control from upper layers, including the application layer 49, 64. Approaches at or below the transport layer 48, including, by way of example and not by way of limitation, transport 58, network 56 or data link 54 layers, may not respond efficiently to changing mission objectives, changing message QoS characteristics or mission situations which are application layer related. The delegation of resource (e.g., bandwidth) management exclusively to lower layers, for example, through policing or congestion avoidance, may imply that an application will either be unaware of current network conditions when policing is employed and will thus not be proactive in avoiding congestion, or that congestion avoidance is not uniformly applied to all concurrent applications in a mission according to mission objectives. The transport layer 58 and below simply may not have sufficient knowledge regarding mission objectives as embodied in importance and urgency of messages in concurrent distributed applications. As a result, resource management approaches at those lower layers may not achieve mission-wide global optimality. Through coordination and knowledge of mission objectives, the present disclosure may implement resource (e.g., bandwidth) management from upper layers that is proactive, responsive, and globally optimal.

Figure 4:
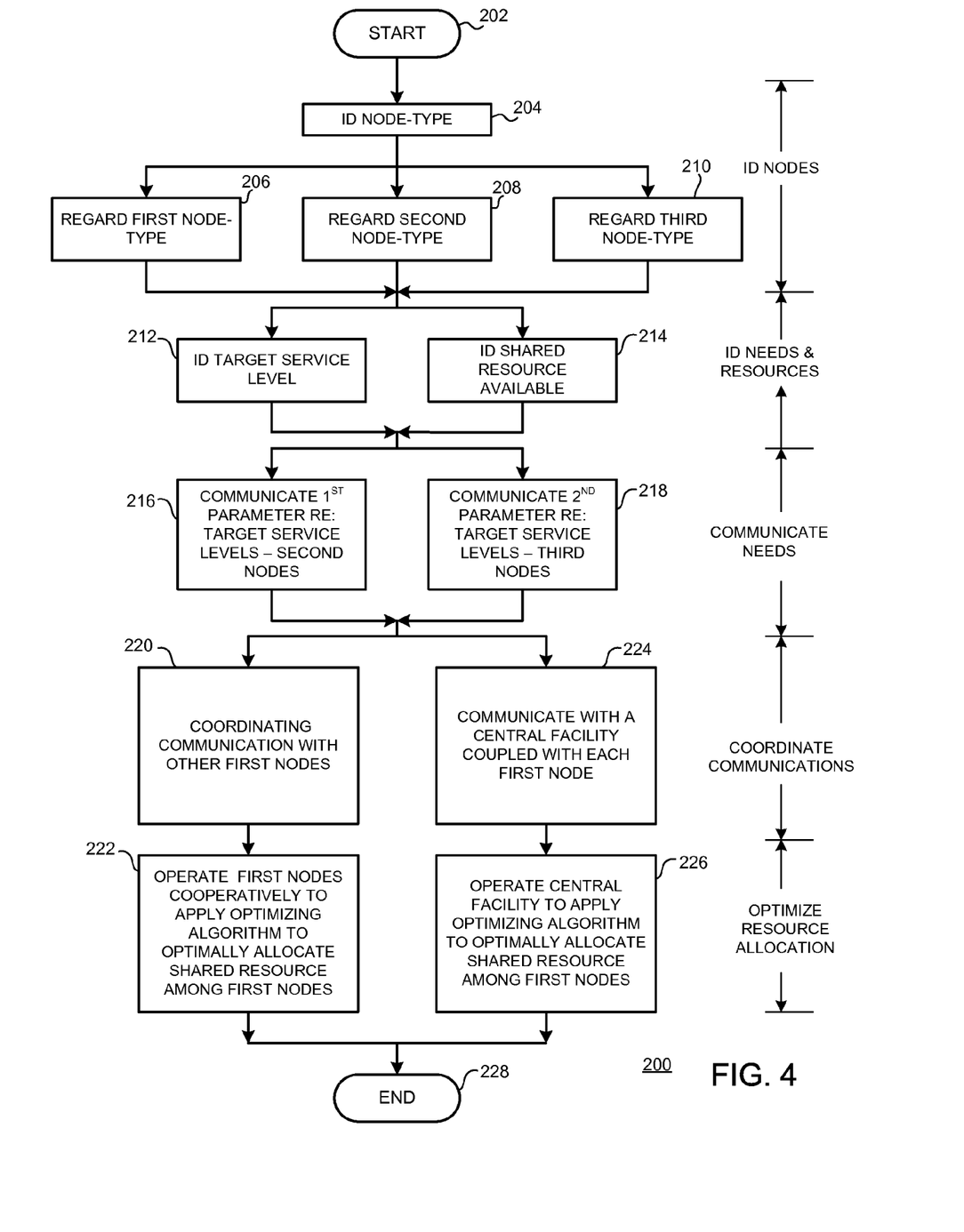
FIG. 4 is a flow diagram illustrating the method of the present disclosure.

FIG. 4 is a flow diagram illustrating the method of the present disclosure. In FIG. 4, a method 200 for managing distribution of a shared resource among a plurality of nodes in a network may begin at a START locus 202. Method 200 may continue with functionally identifying respective nodes of the plurality of nodes to recognize each respective node as a respective node-type, as indicated by a block 204.

Method 200 may continue with, in no particular order: (1) regarding a first set of the respective nodes as first nodes of a first node-type, as indicated by a block 206; (2) regarding a second set of the respective nodes as second nodes of a second node-type, as indicated by a block 208; each respective second node being communicatively coupled with at least one first node; and (3) regarding a third set of the respective nodes as third nodes of a third node-type, as indicated by a block 210; each respective third node being communicatively coupled with at least one first node.

Method 200 may continue with, in no particular order: (1) identifying at least one respective target service level for each respective node, as indicated by a block 212; and (2) identifying the shared resource available for distribution, as indicated by a block 214.

Method 200 may continue with, in no particular order: (1) communicating a first parameter representing at least one respective target service level for each respective second node with a communicatively coupled respective first node, as indicated by a block 216; and (2) communicating a second parameter representing at least one respective target service level for each respective third node with a communicatively coupled respective first node, as indicated by a block 218.

Method 200 may continue with operating each first node as an originating node to effect one of: (1) coordinating communication with substantially all other first nodes other than the originating node, as indicated by a block 220; and operating the first nodes cooperatively applying an optimizing algorithm to substantially optimally allocate the shared resource among the first nodes, as indicated by a block 222; and (2) communicating with a central facility, as indicated by a block 224; the central facility being coupled with each the first node and operating to apply an optimizing algorithm to substantially optimally allocate the shared resource among the first nodes, as indicated by a block 226. Method 200 may terminate at an END locus 224.

Method steps represented by blocks 204, 206, 208, 210 may be regarded as effecting an identification of nodes step.

Method steps represented by blocks 212, 214 may be regarded as effecting an identification of needs and resources step.

Method steps represented by blocks 216, 218 may be regarded as effecting a communicating of needs step.

The method steps represented by blocks 220, 224 may be regarded as effecting alternative coordinating communication steps.

The method steps represented by blocks 222, 226 may be regarded as effecting alternative optimizing resource allocation steps.

By way of example and not by way of limitation, the method of the present disclosure may be described in terms of allocating bandwidth among nodes in a network dynamically in an optimal way to meet mission objectives. The allocation may based on one of the two coordination processes described above (i.e., central authority or peer-to-peer coordination) considering the importance and urgency of messages in a mission.

Algorithms, which may provide an optimal solution, are provided for the following two problems: (1) How to optimally allocate bandwidth to brokers? (2) How to optimally allocate bandwidth to brokers and to publishers and subscribers on each broker?

An objective is to allocate bandwidth to bandwidth-sharing brokers for delivering messages to achieve a maximum global value, which is defined as gains from delivering messages with minimal system-wide delays according to message importance and urgency in a mission. In this disclosure, the problem of minimizing system wide (i.e., global) weighted delays in order to maximize the global value of messages to the mission in terms of urgency may be addressed. Value functions may also be developed that characterize gains from message importance, i.e., whether and when to deliver (guaranteed) a message or drop (non-guaranteed) a message in conditions of scarce resources.

Problem formulations and corresponding optimal algorithms may be presented to address (1) How to optimally allocate bandwidth to brokers? (2) How to optimally allocate bandwidth to brokers and to publishers and subscribers on each broker?

In a problem formulation to address question (1), bandwidth (measured in bytes per second) may be optimally partitioned between the brokers sharing the bandwidth in the underlying network. An objective may be to minimize the sum of the weighted (by priorities) delay to deliver messages for each broker. Delay to deliver a message to receivers may be assumed to be determined by the size of the message divided by the allocated bandwidth. This problem may be regarded as a nonlinear convex optimization problem. The Karush-Kuhn-Tucker (KKT) conditions may be leveraged in the development of the algorithm.

The problem formulation to address question (2) may have two optimization levels and may share many of the same characteristics of the problem formulation to address question (1). At a top level, bandwidth (measured in bytes per second) may be optimally partitioned among brokers sharing the bandwidth in the underlying network. The lower and upper bound requests from each broker may be taken into account in the optimization. Just as in the first problem formulation, the objective function of each broker may be to minimize the sum of the weighted (by priorities) delay to deliver prioritized messages in a mission. Delay to deliver a message to receivers may be assumed to be the message size divided by allocated bandwidth for each broker. The top level problem may be regarded as a nonsmooth convex optimization problem, while each broker problem may be regarded as a nonlinear convex optimization problem. The KKT optimality conditions (or extensions of KKT optimality conditions to the nonsmooth optimization case) may be leveraged in the development of an algorithm for this problem formulation as well.

A formulation to address question (1) may be:

$$(S1) \min \sum_{b=1}^{NB} \frac{v_b}{x_b}$$

$$\sum_{b=1}^{NB} x_b \leq TB$$

$$x_b \geq 0 \text{ for each broker } b$$

$$v_b = \sum_{k=1}^{NM_b} w_{b,k} s_{b,k}$$

The objective may be to allocate bandwidth to bandwidth-sharing brokers for delivering messages to achieve the maximum global value, which may be defined as gains from delivering messages with minimal system wide delays according to message importance and urgency in a mission. In this disclosure, we may address the problem of minimizing system wide (i.e., global) weighted delays in order to maximize the global value of messages to the mission in terms of urgency.

The objective function $v_b/x_b$ may correspond to the weighted message transmission delay.

$NM_b$ may be the number of messages in the queue for broker b $w_{b,k}$ may be the weight of broker b's k-th message
  Determined by mission tasks publishing or subscribing to this message $s_{b,k}$ may be the size of broker b's k-th message
  $s_{b,k}/x_b$ may correspond to the message transmission delay $x_b$ may be the amount of bandwidth allocated to broker b TB may be the total bandwidth available NB may be the number of brokers A formulation to address question (2) may be:

$$(S2) \min \sum_{b \in B} v_b(x_b)$$

$$\sum_{b \in B} x_b \leq TB$$

and $$BL_b \leq x_b \leq BU_b \text{ for each } b \in B$$

$$v_b(x_b) \equiv \min \sum_{id \in C(b)} \frac{v_{b,id}}{x_{b,id}}$$

$$\sum_{id \in C(b)} x_{b,id} \leq x_b$$

$$CL_{b,id} \leq x_{b,id} CU_{b,id} \text{ for each client of } b: id \in C(b)$$

The objective may be to allocate bandwidth to bandwidth-sharing brokers for delivering messages to achieve the maximum global value, which may be defined as gains from delivering messages with minimal system wide delays according to message importance and urgency in a mission. In this disclosure, by way of example and not by way of limitation, we may address the problem of minimizing the system wide (i.e., global) weighted delays in order to maximize the global value of messages to the mission in terms of urgency B may be the set of all brokers C(b) may be the set of all publisher or subscriber clients for broker b $v_{b,id}$ may be the total weighted transmission size for all messages broker b communicates with a publisher or subscriber client id, $v_{b,id}$ may be calculated similarly to $v_b$ (in the broker only case)

$x_b$ may be the amount of bandwidth allocated to broker b $x_{b,id}$ may be the amount of bandwidth broker b allocates to a publisher or subscriber client id TB may be the total bandwidth available $BL_b/BU_b$ may be a minimum or maximum bandwidth that can be allocated to broker b $CL_{b,id}/CU_{b,id}$ may be the min/max bandwidth broker b can allocate to a publisher or subscriber client id.

In this disclosure may be presented a networked system or system of systems as a cooperating networked system of nodes and a process for finding an optimal solution to a bandwidth resource allocation problem. The disclosed system design, evaluation process, and problem formulations may enable development of mathematical algorithms to computationally find optimal solutions to address questions (1) and (2) above. The algorithms may be implemented in software for use with a computer to aid a capability that may enable shared bandwidth resources to be optimally allocated to needy networked nodes in a manner to specifically address fulfillment of a mission and its QoS requirements.

In the problem formulation where only brokers are considered, an objective may be to maximize the total system of systems value subject to no more than the total amount of bandwidth (measured in bytes per second) being allocated to brokers. The problem may be regarded as a convex optimization problem. As a result, a solution $x_b$ to the following Karush-Kuhn-Tucker (KKT) optimality conditions may be an optimal solution. Using the KKT conditions, it may be shown that the following may be a solution to the first optimization problem (addressing question (1) above):

$$x_b = \frac{\sqrt{v_b}}{\sum_{b=1}^{NB} \sqrt{v_b}} * TB \text{ for all brokers}$$

In the second problem formulation (addressing question (2) above), at a top level the objective may be to maximize the total system of systems value subject to no more than the total amount of bandwidth (measured in bytes per second) being allocated to the brokers and subject to each broker being allocated bandwidth within its lower and upper bounds. The total system of systems value may be the sum of the value for each broker. The value for each broker may be a sum of the weighted delays for each client request. Each broker problem may be regarded as a nonlinear convex optimization problem. The system of systems problem may be regarded as a nonsmooth convex optimization problem. The algorithm may iterate through all combinations of the solution of each broker being at the lower or upper bound or between the two bounds. When there may be broker solutions between the two bounds, all possible derivatives of each nonsmooth broker function may be considered as potentially being part of the solution. Possible solutions may be checked for optimality using the KKT conditions for the problem. This algorithm was developed for use with a limited number of brokers and clients. Additional algorithms may be required to address problems with a larger number of brokers and clients.

An algorithm for the first problem formulation (i.e., how to allocate bandwidth among brokers) may be employed in an algorithm for the lower level problem (i.e., determining how a broker may optimally allocate bandwidth among its clients). At each step of the algorithm for an individual broker, the available bandwidth may be optimally divided among the clients according to the client values, using the algorithm for the first problem formulation. If this allocation meets both the lower and upper bounds for each client, the total solution may be optimal; otherwise, the current allocations may be adapted to meet the bounds and the remaining bandwidth may again be divided among the clients not already allocated bandwidth in the same way. In this algorithm, client allocations may not be set to the lower bounds until the end of exercising the algorithm.

It is to be understood that, while the detailed drawings and specific examples given describe preferred embodiments of the disclosure, they are for the purpose of illustration only, that the method of the disclosure are not limited to the precise details and conditions disclosed and that various changes may be made therein without departing from the spirit of the disclosure which is defined by the following claims:

We claim:

1. A method for managing distribution of a shared resource among a plurality of nodes in a network; the method comprising:
   (a) functionally identifying respective nodes of said plurality of nodes to recognize each said respective node as a respective node-type;
   (b) in no particular order:
      (1) regarding a first set of said respective nodes as first nodes of a first node-type;
      (2) regarding a second set of said respective nodes as second nodes of a second node-type; each respective said second node being communicatively coupled with at least one said first node; and
      (3) regarding a third set of said respective nodes as third nodes of a third node-type; each respective said third node being communicatively coupled with at least one said first node;
   (c) in no particular order:
      (1) identifying at least one respective target service level for each said respective node; and
      (2) identifying said shared resource available for said distribution;
   (d) in no particular order:
      (1) communicating a first parameter representing said at least one respective target service level for each said respective second node with a communicatively coupled respective first node; said first parameter being based at least in part upon at least one pending or projected condition at said respective second node; and
      (2) communicating a second parameter representing said at least one respective target service level for each said respective third node with a communicatively coupled respective first node; said second parameter being based at least in part upon at least one pending or projected condition at said respective third node;
   (e) operating each said first node as an originating node to effect one of:
      (1) coordinating communication with substantially all other first nodes other than said originating node; and operating said first nodes cooperatively applying an optimizing algorithm to substantially optimally allocate said shared resource among said first nodes; said optimizing algorithm employing at least one of said first parameter and said second parameter; and
      (2) communicating with a central facility; said central facility being coupled with each said first node and operating to apply an optimizing algorithm to substantially optimally allocate said shared resource among said first nodes; said optimizing algorithm employing at least one of said first parameter and said second parameter.

2. The method for managing distribution of a shared resource among a plurality of nodes in a network as recited in claim 1 wherein said coordinating communication is carried out via said central facility.

3. The method for managing distribution of a shared resource among a plurality of nodes in a network as recited in claim 1 wherein said coordinating communication is carried out directly among said first nodes and said central facility.

4. The method for managing distribution of a shared resource among a plurality of nodes in a network as recited in claim 1 wherein said first node-type is broker node; said broker node collecting messages from said plurality of nodes and disseminating messages among said plurality of nodes; wherein said second node-type is publisher node; said publisher node originating messages for transmission via said network; and wherein said third node-type is subscriber node; said subscriber node receiving messages transmitted via said network.

5. The method for managing distribution of a shared resource among a plurality of nodes in a network as recited in claim 1 wherein said respective target service level for each respective node is identified in terms of quality of service parameters; each said respective first node cooperating with a communicatively coupled second node to present said first parameter representing said at least one respective target service level in terms of said shared resource; each said respective first node cooperating with a communicatively coupled third node to present said second parameter representing said at least one respective target service level in terms of said shared resource.

6. The method for managing distribution of a shared resource among a plurality of nodes in a network as recited in claim 2 wherein said respective target service level for each respective node is identified in terms of quality of service parameters; each said respective first node cooperating with a communicatively coupled second node to present said first parameter representing said at least one respective target service level in terms of said shared resource; each said respective first node cooperating with a communicatively coupled third node to present said second parameter representing said at least one respective target service level in terms of said shared resource.

7. The method for managing distribution of a shared resource among a plurality of nodes in a network as recited in claim 3 wherein said respective target service level for each respective node is identified in terms of quality of service parameters; each said respective first node cooperating with a communicatively coupled second node to present said first parameter representing said at least one respective target service level in terms of said shared resource; each said respective first node cooperating with a communicatively coupled third node to present said second parameter representing said at least one respective target service level in terms of said shared resource.

8. The method for managing distribution of a shared resource among a plurality of nodes in a network as recited in claim 4 wherein said respective target service level for each respective node is identified in terms of quality of service parameters; each said respective first node cooperating with a communicatively coupled second node to present said first parameter representing said at least one respective target service level in terms of said shared resource; each said respective first node cooperating with a communicatively coupled third node to present said second parameter representing said at least one respective target service level in terms of said shared resource.

9. A method for managing sharing of a resource among a plurality of nodes in a network; the method comprising:
   (a) functionally identifying respective nodes of said plurality of nodes to recognize each said respective node as a respective node-type; a first set of said respective nodes being first nodes of a first node-type; a second set of said respective nodes being second nodes of a second node-type; each respective said second node being communicatively coupled with at least one said first node;
   (b) in no particular order:
      (1) identifying a respective target level for said resource for each said respective node; and
      (2) identifying an amount of said resource available for said sharing;
   (c) communicating a parameter representing said respective target level for each said respective second node with a communicatively coupled respective first node; said parameter being based at least in part upon at least one pending or projected condition at said respective second node;
   (d) operating each said first node as an originating node to effect one of:
      (1) coordinating communication with substantially all other first nodes other than said originating node; and cooperatively applying a first optimizing algorithm to substantially optimally allocate said resource among said first nodes; said first optimizing algorithm employing said parameter; and
      (2) communicating with a central facility; said central facility being coupled with each said first node and operating to apply a second optimizing algorithm to substantially optimally allocate said resource among said first nodes; said second optimizing algorithm employing said parameter.

10. The method for managing sharing of a resource among a plurality of nodes in a network as recited in claim 9 wherein said coordinating communication is carried out via said central facility.

11. The method for managing sharing of a resource among a plurality of nodes in a network as recited in claim 9 wherein said coordinating communication is carried out directly among said first nodes and said central facility.

12. The method for managing sharing of a resource among a plurality of nodes in a network as recited in claim 9 wherein said first node-type is broker node; said broker node collecting messages from said plurality of nodes and disseminating messages among said plurality of nodes; wherein said second node-type is one of a publisher node or a subscriber node; said publisher node originating messages for transmission via said network; said subscriber node receiving messages transmitted via said network.

13. The method for managing sharing of a resource among a plurality of nodes in a network as recited in claim 10 wherein said first node-type is broker node; said broker node collecting messages from said plurality of nodes and disseminating messages among said plurality of nodes; wherein said second node-type is one of a publisher node or a subscriber node; said publisher node originating messages for transmission via said network; said subscriber node receiving messages transmitted via said network.

14. The method for managing sharing of a resource among a plurality of nodes in a network as recited in claim 11 wherein said first node-type is broker node; said broker node collecting messages from said plurality of nodes and disseminating messages among said plurality of nodes; wherein said second node-type is one of a publisher node or a subscriber node; said publisher node originating messages for transmission via said network; said subscriber node receiving messages transmitted via said network.

15. A method for determining distribution of a shared resource among a plurality of nodes in a network; the method comprising:
   (a) identifying each respective node of said plurality of nodes according to a function performed by said respective node; broker nodes among said plurality of nodes collecting messages from said plurality of nodes and disseminating messages among said plurality of nodes; publisher nodes among said plurality of nodes originating messages for transmission via said network; subscriber nodes among said plurality of nodes receiving messages transmitted via said network;
   (b) in no particular order:
      (1) identifying at least one respective need for each said respective node; and
      (2) identifying said shared resource available for said distribution;
   (c) communicating said at least one respective need within said network to said broker nodes;
   (d) operating at least one of one or more said broker nodes and a central facility coupled with said broker nodes to effect coordinating communications among said broker nodes; and
   (e) operating at least one of one or more said broker nodes and a central facility coupled with said broker nodes to effect cooperatively applying an optimizing algorithm to substantially optimally allocate said resource among said broker nodes;
said optimizing algorithm employing at least one of said at least one respective need and said shared resource available.

16. The method for determining distribution of a shared resource among a plurality of nodes in a network as recited in claim 15 wherein said coordinating communication is carried out via said central facility.

17. The method for determining distribution of a shared resource among a plurality of nodes in a network as recited in claim 15 wherein said coordinating communication is carried out directly among said broker nodes and said central facility.

18. The method for determining distribution of a shared resource among a plurality of nodes in a network as recited in claim 15 wherein said optimizing algorithm employs at least one of Karush-Kuhn-Tucker conditions or extensions of Karush-Kuhn-Tucker conditions.

19. The method for determining distribution of a shared resource among a plurality of nodes in a network as recited in claim 16 wherein said optimizing algorithm employs at least one of Karush-Kuhn-Tucker conditions or extensions of Karush-Kuhn-Tucker conditions.

20. The method for determining distribution of a shared resource among a plurality of nodes in a network as recited in claim 17 wherein said optimizing algorithm employs at least one of Karush-Kuhn-Tucker conditions or extensions of Karush-Kuhn-Tucker conditions.

* * * * *